United States Patent
Hu et al.

(10) Patent No.: US 12,551,801 B1
(45) Date of Patent: Feb. 17, 2026

(54) PLAYER NEGATIVE BEHAVIOR DETECTION METHOD, SYSTEM, ELECTRONIC DEVICE, AND STORAGE MEDIUM

(71) Applicant: HANGZHOU ELECTRONIC SOUL NETWORK TECHNOLOGY CO., LTD, Hangzhou (CN)

(72) Inventors: Jianping Hu, Hangzhou (CN); Bochao Chen, Hangzhou (CN); Yabing He, Hangzhou (CN)

(73) Assignee: HANGZHOU ELECTRONIC SOUL NETWORK TECHNOLOGY CO., LTD, Hangzhou (CN)

( * ) Notice: Subject to any disclaimer, the term of this patent is extended or adjusted under 35 U.S.C. 154(b) by 0 days.

(21) Appl. No.: 19/247,342

(22) Filed: Jun. 24, 2025

(30) Foreign Application Priority Data

Jan. 13, 2025 (CN) .......................... 202510046655.0

(51) Int. Cl.
*A63F 13/75* (2014.01)
*A63F 13/533* (2014.01)
(Continued)

(52) U.S. Cl.
CPC ............ *A63F 13/75* (2014.09); *A63F 13/533* (2014.09); *A63F 13/60* (2014.09); *A63F 13/67* (2014.09);
(Continued)

(58) Field of Classification Search
CPC ...... A63F 13/798; A63F 13/795; A63F 13/67; A63F 13/79; A63F 13/60; A63F 13/75;
(Continued)

(56) References Cited

U.S. PATENT DOCUMENTS 10,357,713 B1\* 7/2019 Landers ................. A63F 13/40
10,561,945 B2\* 2/2020 Reiche, III ............. A63F 13/52
(Continued)

FOREIGN PATENT DOCUMENTS

CN 106621336 A 5/2017
CN 106815451 A 6/2017
(Continued)

OTHER PUBLICATIONS

First Office Action for Chinese Priority Application, 202510046655.0, Feb. 26, 2025.
(Continued)

*Primary Examiner* — William H Mcculloch, Jr.
(74) *Attorney, Agent, or Firm* — Koivula & Somersalo, LLC

(57) ABSTRACT

A player negative behavior detection method, a system, an electronic device, and a storage medium are provided, wherein the method includes: comprehensively collecting behavioral data such as the player operation counts, the chat content, the behavioral data, the position information, and the cooperation request responses in the single-round game; processing and analyzing the data by calculating the operation frequency score and the single behavior score, constructing a position heatmap, counting the negative word counts, and calculating the cooperation request response counts, so as to obtain multi-dimensional detection data such as game behavior, game performance, and social behavior; and comparing the comprehensive operation frequency score of the player, the single behavior score, and the expected score, combining the comparison to the scores of the other players in the team, so as to determine the negative behavior, and to output the reminding information.

6 Claims, 5 Drawing Sheets

(51) Int. Cl.
*A63F 13/60* (2014.01)
*A63F 13/67* (2014.01)
*A63F 13/79* (2014.01)
*A63F 13/798* (2014.01)
*A63F 13/69* (2014.01)
*A63F 13/795* (2014.01)
*A63F 13/86* (2014.01)

(52) U.S. Cl.
CPC ............ *A63F 13/79* (2014.09); *A63F 13/798* (2014.09); *A63F 13/69* (2014.09); *A63F 13/795* (2014.09); *A63F 13/86* (2014.09); *A63F 2300/558* (2013.01); *A63F 2300/5586* (2013.01)

(58) Field of Classification Search
CPC ........ A63F 13/69; A63F 13/533; A63F 13/85; A63F 13/86; A63F 2300/558; A63F 2300/5586
See application file for complete search history.

(56) References Cited

U.S. PATENT DOCUMENTS

| | | | | |
|---|---|---|---|---|
| 10,974,150 | B2* | 4/2021 | Reiche, III | .............. A63F 13/69 |
| 11,040,286 | B2* | 6/2021 | Reiche, III | ............ A63F 13/795 |
| 11,291,915 | B1* | 4/2022 | Dicken | ................ G06N 3/0442 |
| 11,806,631 | B2* | 11/2023 | Nair | ...................... A63F 13/798 |
| 2016/0364652 | A1 | 12/2016 | Fei et al. | |
| 2019/0091575 | A1* | 3/2019 | Reiche, III | ............ A63F 13/798 |
| 2019/0091577 | A1* | 3/2019 | Reiche, III | ............ A63F 13/795 |
| 2019/0091582 | A1* | 3/2019 | Reiche, III | .............. A63F 13/25 |
| 2021/0346807 | A1* | 11/2021 | Nair | ........................ A63F 13/85 |
| 2023/0132529 | A1* | 5/2023 | Paddon | .............. H04N 21/2408 |
| | | | | 386/241 |
| 2023/0321548 | A1* | 10/2023 | Vogel | ...................... A63F 13/67 |
| | | | | 463/42 |
| 2024/0009577 | A1* | 1/2024 | Nair | ...................... A63F 13/795 |
| 2024/0342614 | A1* | 10/2024 | Gonen | ................... A63F 13/75 |
| 2025/0073598 | A1* | 3/2025 | Taylor | .................... A63F 13/75 |

FOREIGN PATENT DOCUMENTS

| | | |
|---|---|---|
| CN | 107158707 A | 9/2017 |
| CN | 112973128 A | 6/2021 |
| CN | 114602186 A | 6/2022 |
| CN | 115054928 A | 9/2022 |
| EP | 3740294 A1 | 11/2020 |

OTHER PUBLICATIONS

Second Office Action for Chinese Priority Application, 202510046655.0, Mar. 19, 2025.

League of Legends Wild Rift Season 4 begins today, with the Season Journey system officially launching and detection of negative gameplay behavior increased by 950%., Available at: https://www.ithome.com/0/594/561.htm, Published Dec. 24, 2021.

Notification to Grant Patent Right for Invention, for Chinese Priority Application, 202510046655.0, Apr. 8, 2025.

* cited by examiner

PLAYER NEGATIVE BEHAVIOR DETECTION METHOD, SYSTEM, ELECTRONIC DEVICE, AND STORAGE MEDIUM

CROSS-REFERENCE TO RELATED APPLICATION

The present disclosure claims priority to Chinese patent application No. 202510046655.0, filed with the Chinese Patent Office on Jan. 13, 2025, entitled "PLAYER NEGATIVE BEHAVIOR DETECTION METHOD, SYSTEM, ELECTRONIC DEVICE, AND STORAGE MEDIUM", the entire contents of which are incorporated herein by reference.

TECHNICAL FIELD

The present disclosure relates to the field of game software development and in particular to a player negative behavior detection method, a system, an electronic device, and a computer-readable storage medium.

BACKGROUND ART

Player-versus-player online games, whose core gameplay focuses on competition between players, are often referred to as "PVP" online games. In this type of game, the game experience of the player is closely linked to the game behaviors of other players, and significantly influences each other.

The negative behavior is a behavioral pattern exhibited by players during the game process, including not actively participating in the game process, deliberately delaying time, or using other methods to adversely affect teammates or opponents in the game team. Once a player exhibits the negative behavior, the game experience for the other players in the game will take a sharp downturn. If it continues for a long time the game will face a massive loss of players. The trust of the game product will be greatly reduced, which may even affect the reputation of the game developer.

In the related arts, the detection system for player negative behavior, in the current field of versus player online games, still has obviously deficiencies. A reporting system is commonly used. The system mainly relies on active reporting by the player to identify players with the negative behavior, and imposes penalties accordingly. However, this method has limitations, since it relies entirely on the consciousness and initiative of the player, it is difficult to comprehensively, quickly, and accurately detect all players exhibiting negative behaviors, which results in some negative behaviors not being detected and handled in a timely manner.

SUMMARY

A player negative behavior detection method is provided, and is applied in a PVP online game, wherein the method includes:
  acquiring game data of a player during a single-round game process;
  analyzing and classifying the game data to obtain multi-dimensional detection data, wherein the multi-dimensional detection data includes: game behavior data, game performance data, and social behavior data; and
  determining whether the player has a negative behavior based on the multi-dimensional detection data, outputting negative behavior reminding information if yes.

A player negative behavior detection system is provided, and the system includes: an acquisition module, an analysis and processing module, and a determination module, wherein
  the acquisition module is configured to acquire game data of a player during a single-round game process;
  the analysis and processing module is configured to analyze and classify the game data to obtain multi-dimensional detection data, wherein the multi-dimensional detection data includes: game behavior data, game performance data, and social behavior data; and
  the determination module is configured to determine whether the player has a negative behavior based on the multi-dimensional detection data, and to output negative behavior reminding information if yes.

A computer device is provided, including a memory, a processor, and a computer program stored in the memory and operable in the processor, wherein the processor executes the computer program to realize the method according to the above first aspect.

A computer-readable storage medium is provided, with a computer program stored thereon, and the method in the above first aspect is realized when the computer program is executed by the processor.

BRIEF DESCRIPTION OF DRAWINGS

The drawings illustrated herein are used to provide a further understanding of the present disclosure and constitute a part of the present disclosure. The schematic embodiments of the present disclosure and their description are used to explain the present disclosure, and do not constitute an undue limitation of the present disclosure. In the drawings.

DETAILED DESCRIPTION OF EMBODIMENTS

Figure 1:
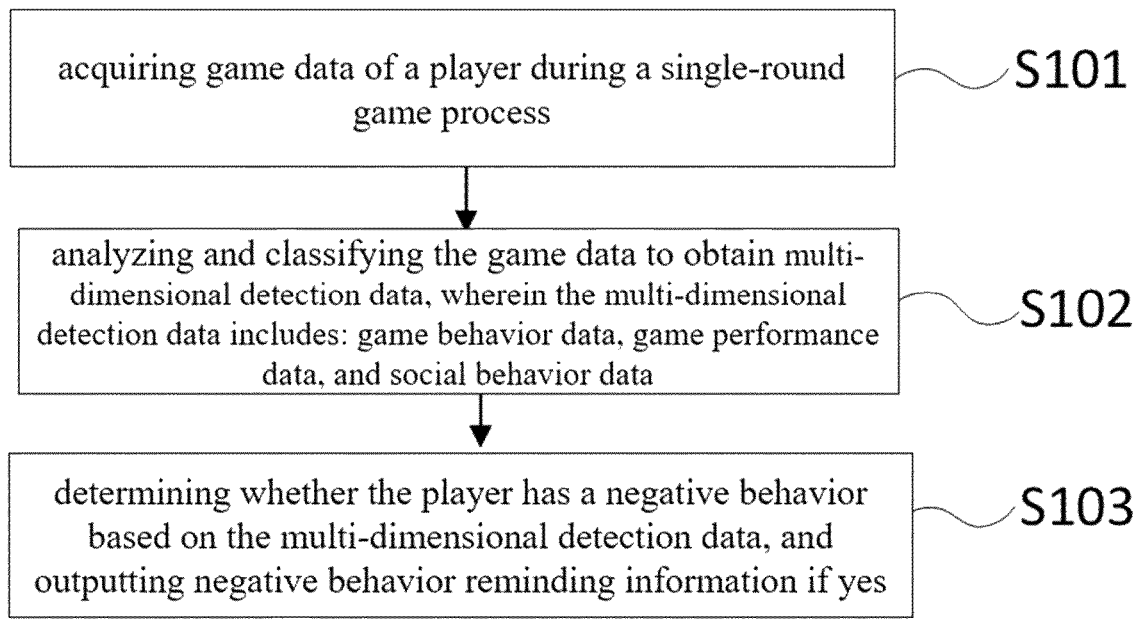
FIG. 1 is a flow diagram of a player negative behavior detection method provided based on the embodiments of the present disclosure.

In order to make the purpose, technical solutions, and advantages of the present disclosure more clearly to be understood, the present disclosure is described below in conjunction with the drawings and the embodiments. It should be understood that the specific embodiments described herein are intended only to illustrate the present disclosure, and are not intended to limit the present disclosure. Based on the embodiments of the present disclosure, all other embodiments obtained by a person of ordinary skill in the art without inventive efforts, shall fall within the scope of protection of the present disclosure.

It is obvious that the drawings in the following description are only some examples and embodiments of the present disclosure, and for persons of ordinary skill in the art, the present disclosure can be applied to other similar scenarios based on these drawings without inventive efforts. In addition, it is also understood that although the efforts made in such a development process may be complex and lengthy, for ordinary skill in the art related to the content disclosed in the present disclosure, some design, manufacturing, or production changes made on the basis of the technical content disclosed in the present disclosure are only conventional technical means, and it should not be understood that the content disclosed in the present disclosure is insufficient.

Reference to "embodiment" in the present disclosure means that particular features, structures, or characteristics described in conjunction with the embodiments can be included in at least one embodiment of the present disclosure. The occurrence of the phrase at various positions in the specification does not necessarily all refer to the same embodiment, nor is it an independent or alternative embodiment that is mutually exclusive with other embodiments. It is explicitly and implicitly understood by those skilled in the art that the embodiments described in the present disclosure can be combined with other embodiments without conflict.

Unless otherwise defined, technical terms or scientific terms referred to in the present disclosure shall have ordinary meaning understood by a person of ordinary skill in the art to which the present disclosure belongs. The words "a", "one", "a type of", "the", and similar words in the present disclosure do not indicate a limitation of quantity, but may denote the singular or the plural. The terms "include", "comprise", "have", and any variations thereof involved in the present disclosure are intended to cover a non-exclusive inclusion. For example, a process, method, system, product, or device that contains a series of steps or modules (units) is not limited to the listed steps or units, but can also include steps or units that are not listed, or can also include other steps or units inherent to these processes, methods, products or devices. The terms "connect", "link", "couple" and the like as used in the present disclosure are not limited to physical or mechanical connections, but can include electrical connections, whether direct or indirect. The term "plurality" as used in the present disclosure means two or more. The "and/or" is merely an association relationship for describing associated objects, and represents three relationships can exist, e.g., A and/or B can represent three cases: A alone, both A and B, and B alone. The character "/" generally indicates that before and after associated objects have an "or" relationship. The terms "first", "second", "third", etc. involved in the present disclosure are merely used to distinguish similar objects, and do not represent a specific order for the objects.

In PVP online games, the game experiences of players are related. If a player plays a game negatively, he or she may not participate in output or resistance damage in the team battle, which results in the failure of the team battle. It will make the actively participating players feel frustrated and directly affect their game experience. In the long term, some players will gradually leave due to the poor game experience resulting from negative behaviors of some players, and the trust of game products will be affected. If players feel that game operator is unable to effectively deal with negative behaviors, their trust in the game will decrease, which in turn affects the credibility of the game developer, so as to cause great harm to the long-term operation of the game.

Currently, well-known PVP games mainly rely on player reports to detect negative behaviors, and this method has obvious limitations. First, the players may not notice negative behaviors of their teammates in time; and second, players may be reluctant to report, e.g., some players may not report them because they are friends with their teammates or afraid of retaliation, which results in the negative behaviors undetectable. As a result, it is difficult for the reporting system to quickly detect all players with negative behaviors. In addition, in a fast-paced game, a battle may end quickly. If players report after the battle is over, it will lead to a lag in dealing with negative behaviors, and an inability to stop negative behaviors in a timely manner during the game, so as to affect the fairness of the game and the experience of other players.

In view of this, the embodiments of the present disclosure provide a player negative behavior detection method, a system, a computer device, and a computer-readable storage medium to at least address the problem of poorer player negative behavior detection accuracy in the related art.

In a first aspect, the embodiments of the present disclosure provide a player negative behavior detection method applied in the PVP online game, and the method includes:
  acquiring game data of a player during a single-round game process;
  analyzing and classifying the game data to obtain multi-dimensional detection data, wherein the multi-dimensional detection data includes: game behavior data, game performance data, and social behavior data; and
  determining whether the player has a negative behavior based on the multi-dimensional detection data, and outputting negative behavior reminding information if yes.

In some of these embodiments, the game behavior data includes: movement counts, skill usage counts, item usage counts, attack counts, real-time positions of the player in the single-round game process;
  the game performance data includes: defeat counts, assist counts, death counts, and total damage; and
  the social behavior data includes: negative speech counts and cooperation request response counts.

In some of these embodiments, a step of determining whether the player has a negative behavior based on the game behavior data includes:
  obtaining a plurality of operation frequencies of different dimensions according to the movement counts, the skill usage counts, the item usage counts, the attack counts, and a single-round game duration respectively, and assigning different weight coefficients to each of the operation frequencies respectively;
  performing weighting operations on the plurality of operation frequencies according to the assigned weight coefficient to obtain a comprehensive operation frequency score;
  obtaining a single behavior score according to a minimum value and a maximum value of the movement counts, the skill usage counts, the item usage counts, and the attack counts; and
  determining whether the player has a negative behavior by determining whether the comprehensive operation frequency score and the single behavior score meet an expected score, and outputting the negative behavior reminding information if yes.

In some of these embodiments, the method further includes:
  generating a player position heatmap according to the real-time position of the player in the single-round game process; and
  determining whether the player has the negative behavior according to a proportion of the player position heatmap to a global game map, and outputting the negative behavior reminding information if yes.

In some of these embodiments, a step of determining whether the player has the negative behavior based on the game performance data includes:

obtaining a plurality of different types of single-round performance averages according to the defeat counts, the assist counts, the death counts, the total damage, and the single-round game duration, and assigning different weight coefficients to each of the single-round performance averages respectively;

performing a weighting operation on the plurality of single-round performance averages according to the assigned weight coefficient, so as to obtain a game performance score of each player;

obtaining a benchmark score according to game performance scores of players in the same camp during the single-round game process; and determining whether the player has the negative behavior according to a difference between the game performance score of any one of the players and the benchmark score, and differences between the game performance score of any one of the players and that of the other players in the same camp, and outputting a negative behavior reminding information if yes.

In some of these embodiments, a step of determining whether the player has a negative behavior based on the social behavior data includes:

determining whether the player has the negative behavior according to the negative speech counts, and outputting a negative behavior reminding information if yes; adjusting the weight coefficient according to the negative speech counts, and performing a weighting operation according to a plurality of frequency parameters or the game performance of the adjusted weight coefficient; and determining whether the player has the negative behavior according to the cooperation request response counts, and outputting the negative behavior reminding information if yes.

In some of these embodiments, a step of analyzing and classifying the game data to obtain multi-dimensional detection data includes:

constructing a preset negative word database according to an open-source database and historical battle data to acquire a chat log sent by the player to a battle environment via a social system during the single-round game process; matching the chat log with the preset negative word database to obtain the negative speech counts;

acquiring an operation behavior of the player during a target time period after a cooperation request from another player in the same camp; determining whether the operation behavior is an operation behavior in response to the cooperation request by matching the operation behavior with a preset response action database; and acquiring operation behavior counts to obtain cooperation request response counts if yes.

In a second aspect, the embodiments of the present disclosure provide a player negative behavior detection system, and the system includes: an acquisition module, an analysis and processing module, and a determination module, wherein the acquisition module is configured to acquire game data of a player during a single-round game process;

the analysis and processing module is configured to analyze and classify the game data to obtain multi-dimensional detection data, wherein the multi-dimensional detection data includes: game behavior data, game performance data, and social behavior data; and the determination module is configured to determine whether the player has a negative behavior based on the multi-dimensional detection data, and to output negative behavior reminding information if yes.

In a third aspect, the embodiments of the present disclosure provide a computer device, including a memory, a processor, and a computer program stored in the memory and operable in the processor, wherein the processor executes the computer program to implement the method as described in the above first aspect.

In a fourth aspect, the embodiments of the present disclosure provide a computer-readable storage medium with a computer program stored thereon, and the method as described in the above first aspect is implemented when the computer program is executed by the processor.

Compared to the related art, the embodiments of the present disclosure provide the player negative behavior detection method, including the following steps: comprehensively collecting behavioral data such as the player operation counts, the chat content, the behavioral data, the position information, and the cooperation request responses in the single-round game; processing and analyzing the data by calculating the operation frequency score and the single behavior score, constructing a position heatmap, counting the negative word counts, and calculating the cooperation request response counts, so as to obtain multi-dimensional detection data such as game behavior, game performance, and social behavior; and comparing the comprehensive operation frequency score of the player, the single behavior score, and the expected score, and combining the comparison to the scores of the other players in the team, so as to determine the negative behavior, and to output the reminding information. This solution effectively solves the problems of the prior reporting system relying on the active report by players and lower detection efficiency, thereby more comprehensively and accurately detecting the negative behavior, maintaining the fairness and healthy environment of the game, and improving the game experience of the players.

In view of this, the embodiments of the present disclosure provide a player negative behavior detection method. FIG. 1 is a flow diagram of a player negative behavior detection method provided based on the embodiments of the present disclosure. As shown in FIG. 1, the method includes the following steps: S101~S103.

S101, acquiring game data of a player during a single-round game process.

Figure 2:
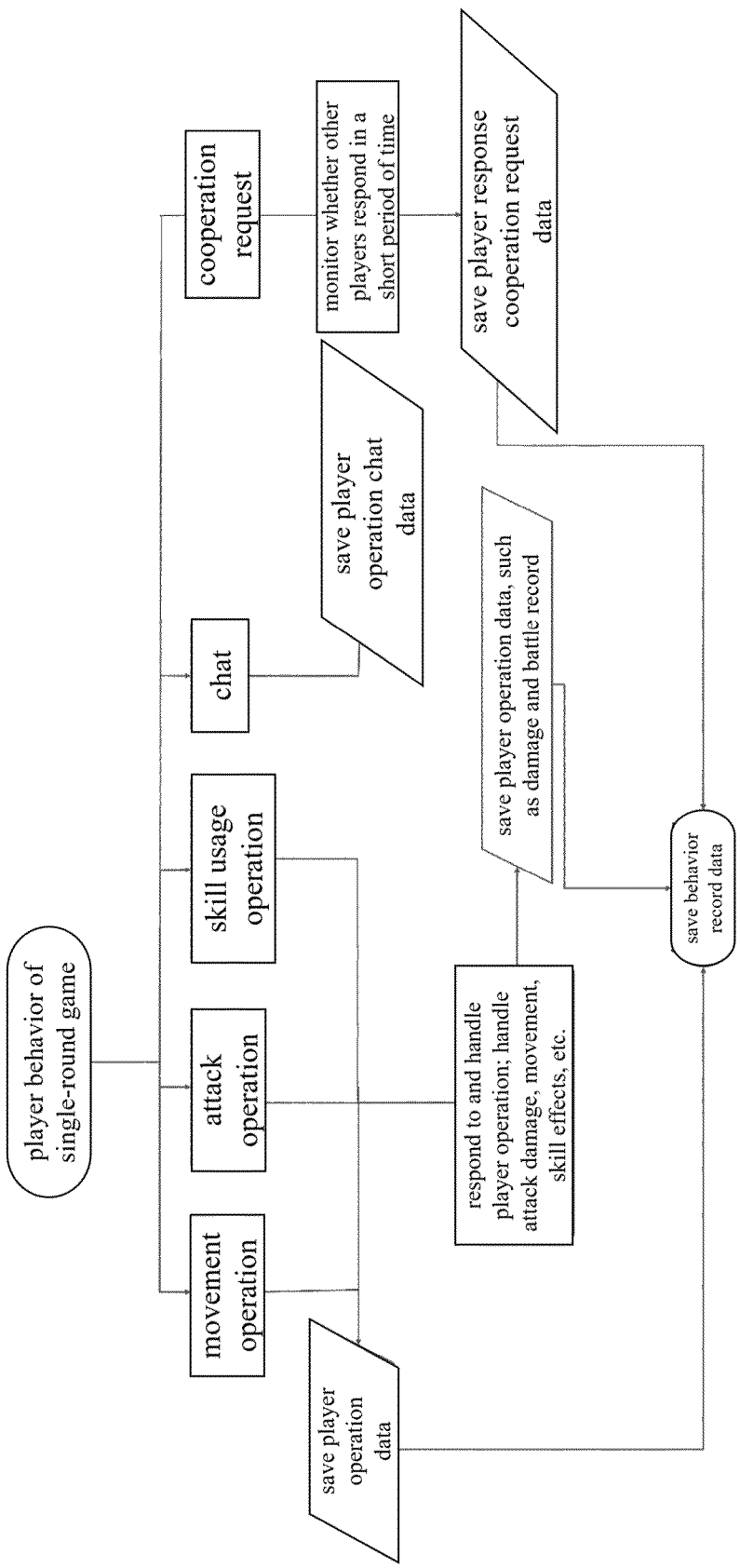
FIG. 2 is a flow diagram of acquiring game data based on the embodiments of the present disclosure.

FIG. 2 is a flow diagram of acquiring game data based on the embodiments of the present disclosure. As shown in FIG. 2, the acquiring game data includes the following steps: including (1)~(3).

(1) Directly Collecting Data

It acquires the player operation (including various operations of the player in the game) counts in the game data, such as the number of operations such as moving, attacking, using skills, and using items. For example, in the Multiplayer Online Battle Arena (MOBA) games, every time the player clicks a movement button or releases a skill, the game background will immediately record an operation. This type of recording method can most intuitively reflect the operational activity level of the player in the game.

In addition, when the player sends a message in the chat box within the game, the game system will record the chat content, and these chat logs can be used for subsequent analysis for the communication condition of the player, and the presence of negative comments, etc.

(2) Recording Result Data

During the game process, when a player causes damage to an enemy, the game will go through a series of computations to determine a final damage value. For example, if the player uses a weapon to attack the enemy, the damage of the weapon will be affected by the distance, the defense attributes of the target, and other factors. After the game engine computes the actual damage value, the damage value will be recorded, and this type of the record can reflect the output ability of the player in battle.

Simultaneously, the game constantly will track the position of the player character in the map, and the movement trajectory of the player in the game map will be recorded. At the game ends, a movement heatmap of the player can be constructed by these position data, so as to analyze whether the player actively explores in the map, and participates in battles, etc.

(3) Recording Monitoring Data

When a player initiates a cooperation request in the game, e.g., the player sends a signal requesting support from teammates, the game system will start to monitor the response of other players. If a teammate makes an action that conforms to the response rules (e.g., moving to the requesting support position), the system will record a response. If no teammate responds within the set time (e.g., 10 seconds), the system stops monitoring.

Through the above step S101, it can collect game data of the player in the game from different perspectives. The direct recording data reflects the immediate action and communication of players; the recording result data reflects the actual impact generated by the player behavior; and the monitoring data focuses on the performance of players in terms of teamwork cooperation. The various types of data can be combined to provide comprehensive understanding of the player in the single-round game, which provides a database for the subsequent negative behavior detection.

S102, analyzing and classifying the game data to obtain multi-dimensional detection data, wherein the multi-dimensional detection data includes: game behavior data, game performance data, and social behavior data.

Optionally, when the amount of data is larger, the game data can be preprocessed first, specifically including:

removing invalid or noisy data from original data, such as incomplete log entries, and duplicate records; converting data from different sources into a uniform format to ensure consistency in subsequent processing; storing the cleaned and formatted data in a database to facilitate subsequent analysis and processing.

Further, the collected data is classified into game behavior data, game performance data, and social behavior data according to different types of data and the detection requirements of the message behavior, and the specific situations are as follows.

The game behavior data includes: movement counts, skill usage counts, item usage counts, attack counts, real-time positions of the player in the single-round game process.

The above data is a direct record of the player manipulating the character in the game. The movement count reflects the activity condition of the player in the map; the skill usage count reflects the usage frequency of the character skills by the player; the item usage count shows the utilization degree of the item resources in the game; and the attack count indicates the enthusiasm of the player in participating in the combat output. They are both used to analyze the operation activity during the game process and participation in the game process of the player, and subsequently it is to determine whether the player plays the game negatively by calculating the operation frequency score other methods.

In addition, the specific position is used to construct a player position heatmap. By comparing it with the proportion of the global map and the other player position heatmaps, it is to determine whether the player participates in the game normally, such as whether he or she actively explores the map or participates in team battles; and the position information can reflect the movement strategy and activity of the player in the game.

The game performance data includes: defeat counts, assist counts, death counts, and total damage.

The defeat counts and the assist counts are the reflection of the results of the player in defeating the enemy or assisting teammates to defeat during the battle, which reflects the output and assisting ability of the player in team battles. The death count is a side reflection of the of the survival ability and the operational risks of the player in the game. The total damage is a comprehensive measure of the output damage of the player to the enemy throughout the entire game. This data is calculated to obtain the player game score, which is compared to the benchmark score and team average level, so as to determine whether the player is negative in terms of game combat performance.

The social behavior data includes: negative speech counts and cooperation request response counts.

It can construct a preset negative word database according to an open-source database and historical game battle data; and after acquiring the chat log sent by the player to the battle environment via the social system during the single-round game process, it is to match the chat log with the preset negative word database to obtain the negative speech counts.

When the player is in the single-round game process, it is to acquire an operation behavior of a certain player during the target time period after a cooperation request from another player in the same camp; it is to determine whether the operation behavior is an operation behavior in response to the cooperation request by matching the response behavior with a preset response action database; and it is to acquire the operation behavior counts to obtain the cooperation request response counts if yes.

It records the responses of players in the game to the other player cooperation request (such as requesting support, and marking targets), which can reflect the activity of the player in teamwork. The active response to the cooperation request can be beneficial to the teamwork and the game progress advancement, and a smaller number of responses may indicate that the player is not active in teamwork, thus assisting in determining whether the player has the negative behavior.

S103, determining whether the player has a negative behavior based on the multi-dimensional detection data, and outputting negative behavior reminding information if yes. It includes the following steps (1)~(3).

(1) The step of determining whether the player has a negative behavior based on the game behavior data includes the following steps: Step1~Step4.

Step1, obtaining a plurality of operation frequencies of different dimensions according to the movement counts, the skill usage counts, the item usage counts, the attack counts, and a single-round game duration respectively, and assigning different weight coefficients to each of the operation frequencies respectively.

Different game types and play methods attach different degrees of importance to various operations. Therefore, in the actual application process, it can specifically assign weight coefficients to each operation frequency according to the game type.

Step2, performing weighting operations on the plurality of frequency parameters according to the assigned weight coefficient to obtain a comprehensive operation frequency score.

One formula for calculating the comprehensive operation frequency score is shown as follows:

$$\left[\text{operation frequency score} = \alpha \cdot \frac{\text{movement count}}{\text{total duration}} + \beta \cdot \frac{\text{skill usage count}}{\text{total duration}} + \gamma \cdot \frac{\text{item usage count}}{\text{total duration}} + \delta \cdot \frac{\text{attack count}}{\text{total duration}}\right],$$

where $\alpha, \beta, \gamma, \delta$ indicate the weights of the movement operation, the skill usage operation, the item usage operation, and the attack operation in the game operation respectively. The higher the weight is, the more important the operation should be in the game.

It is to be noted that the above calculation formula is only an exemplary formula for calculating the player operation frequency score. Those skilled in the art can understand that under the technical framework of the present disclosure, which obtains the comprehensive operation frequency score through weighting operation based on the operation data of various players, the specific calculation formula can be defined according to the actual situation.

Step3, obtaining a single behavior score according to a minimum value and a maximum value of the movement counts, the skill usage counts, the item usage counts, and the attack counts.

In addition, only considering the operation counts is not enough to accurately determine whether a player plays the game negatively, as the player may constantly perform the single operation, such as constantly walking around and constantly using items in place, which are also negative behaviors.

Therefore, in order to more accurately determine whether the player is truly actively participating in the game, the present embodiment further provides a single behavior score calculation mechanism, which can further analyze the diversity and balance of the player operation behavior.

In an exemplary embodiment, the formula for calculating the single behavior score is as follows:

$$\left[\text{single behavior score} = \frac{\min(\text{movement count, skill usage count, item usage count, attack count})}{\max(\text{movement count, skill usage count, item usage count, attack count})}\right].$$

Step4, determining whether the player has a negative behavior by determining whether the comprehensive operation frequency score and the single behavior score meet an expected score, and outputting the negative behavior reminding information if yes.

Specifically, by calculating the distribution of the player among different types of operations, such as movement, skill usage, item usage, and attack, it can not only determine whether a player is performing a single meaningless operation, but also more comprehensively assess the overall behavioral pattern of the player in the game.

In the embodiment, by combining a single behavior score determination mechanism with other determination factors such as operation frequency, it can provide a more comprehensive and accurate determination of player negative behaviors. For example, when determining whether a player is playing the game negatively, it is not only to consider the comprehensive operation frequency score (considering the number and the weight of the operation), but also to consider the single behavior score. If the comprehensive operation frequency score of a player is in the normal range, but the single behavior score is very low, it indicates that the player may have a problem of deliberately performing a single operation, and the player can also be determined as a negative player.

Optionally, the expected score is determined based on a large amount of game test data and normal player behavior pattern analysis, which covers the operation frequency and the distribution of single behavior data. It is to set a threshold range for distinguishing between positive and negative player behaviors, such as a lower limit value of the comprehensive operation frequency score, and a balance threshold value of the single behavior score, and it will also consider the determination criterion of a combination relationship between the two.

It is to determine whether the player is negative by comparing and considering comprehensively the calculated comprehensive operation frequency score of the player and the expected score, and in conjunction with the single behavior score. If the comprehensive operation frequency score is lower than the lower limit value, the single behavior score is lower than the balance threshold value, or the combination of the two shows anomalies (e.g., the frequency is acceptable but the behavior is single), a negative behavior can be determined.

In addition, during the game process, the player will move around various positions in the game map. In the embodiment, all positions that the player moves to during the game process are collected, and the player position heatmap is constructed at the end of the game. The presence of negative behavior is determined by comparing the proportion of each player heatmap relative to the global map. Typically, if the proportion of the player heatmap relative to the global map is too low, or if an overlap proportion of the player heat map to the other player heatmap is too low, it indicates that the player has the negative game behavior.

(2) The step of determining whether the player has a negative behavior based on the game performance data includes the following steps: Step1~Step4.

Step1, obtaining a plurality of single-round performance averages according to the defeat counts, the assist counts, the death counts, the total damage, and the single-round game duration, and assigning different weight coefficients to each of the single-round performance averages respectively.

Different game types and play methods attach different degrees of importance to various games. Therefore, in the actual application process, it can specifically assign weight coefficients to each operation frequency according to the game type.

Step2, performing a weighting operation on the plurality of single-round performance averages according to the assigned weight coefficient, so as to obtain a game performance score of each player.

One formula for calculating the comprehensive operation frequency score is shown as follows:

$$\left[\text{player score} = \left(\alpha \cdot \frac{\text{kill count}}{\text{game duration}} + \beta \cdot \frac{\text{assist count}}{\text{game duration}} - \gamma \cdot \frac{\text{death count}}{\text{game duration}} + \delta \cdot \frac{\text{total damage}}{\text{game duration}}\right) \times (1 + 0.1 \times \text{KDA})\right].$$

It should be noted that α, β, γ, and δ represent the weights of the kill counts, assist counts, death counts, and total damage, which indicate the importance of these data in the game; and KDA is an index to measure the player score in the game, and its formula is as follows:

$$\left[ KDA = \left( \frac{\text{kill count} + \text{assist count}}{\max(1, \text{death count})} \right) \right].$$

In the present embodiment, the player game score calculated by the above formula can basically reflect the performance of the player in a game. In addition, the above calculation formula is only an exemplary formula for calculating the player operation frequency score. In the actual development, the measurement index data can be added or deleted according to the type of game, e.g., if there is a therapy character in some games, the amount of therapy can be included in the score calculation system.

Step3, obtaining a benchmark score according to game performance scores of players in the same camp during the single-round game process.

Step4, determining whether the player has the negative behavior according to a difference between the game performance score of any one of the players and the benchmark score, and differences between the game performance score of any one of the players and that of the other players in the same camp, and outputting a negative behavior reminding information if yes.

The benchmark score is a reference standard for measuring the performance of the player. This benchmark score can reflect the approximate performance level that the player should achieve when actively participating in the game and reasonably exerting the ability of the character under ideal conditions. It provides a basic quantitative basis for determining whether the player plays the game negatively. If a score of a certain player is too low and well below the team player average level, it is assumed that the player may have the negative game behavior.

In the game testing phase, professional testers play the game in an ideal environment according to the optimal strategy, and record the performance data and statistically analyze it, so as to determine the initial benchmark score. As the updating and the balance adjustment of the game, the changes in the character ability, task difficulty, game modes, etc., are re-evaluated or updated according to re-analysis of normal game data after a large number of players updates. It should be noted that the benchmark score needs to be determined respectively according to different game modes and roles and in conjunction with the experience and knowledge in the field.

Further, it is not comprehensive enough to only rely on the player individual score to compare with the benchmark score. The situations of different games may be different, e.g., the difficulty of the game, the cooperation degree of teammates, the strength of the opponents, and other factors will affect the final score of the player.

In some cases, although the score of a player is lower than the benchmark score (e.g., the score of the player is 2 points, which is lower than the preset 5 points), if the entire team faces a greater challenge and the scores of the other teammates are lower (such as 2 or 3 points), at this time, the performance of the player may be in line with the overall level of the team, and it cannot be simply determined that he or she is a negative player. By comparing the scores of the team with the other player scores, it can more accurately assess the relative performance of the player in a specific game environment, and exclude generally lower scores due to external factors, so as to more accurately identify the true negative players.

Through the above Step1-Step4, through reasonable benchmark score designation and team comparison, these negative behaviors can be detected and dealt with in a timely manner, so as to ensure the health of the game environment. Meanwhile, for those players who may be misjudged, this type of judgment gives a fairer treatment, which prevents them from being unfairly punished due to unreasonable judgments, thereby improving the overall player satisfaction and the recognition of the fairness of the game.

(3) The step of determining whether the player has a negative behavior based on the social behavior data includes the following steps: Step1~Step2.

Step1, determining whether the player has the negative behavior according to the negative speech counts, and outputting a negative behavior reminding information if yes; adjusting the weight coefficient according to the negative speech counts; and performing a weighting operation according to a plurality of frequency parameters or the game performance of the adjusted weight coefficient, so as to obtain the comprehensive operation frequency score or the game performance score.

It should be noted that in this solution, a negative word database is established during the development of the game. It includes a series of sensitive words for negative behaviors, including abusive words and other negative words. After the game ends, the system will collect the chat logs of the player in this game, and determine whether the players have made negative remarks based on the appearing number of the player negative words. This is also regarded as a negative behavior, but the penalty for the negative remark is relatively smaller. However, it will increase the coefficients of the results of the other negative behavior detection modules. If the negative behavior does exist, it will increase the final penalty degree.

Step 2, determining whether the player has the negative behavior according to the cooperation request response counts, and outputting the negative behavior reminding information if yes.

There are usually a series of cooperation request operations in the game, including sending signals, requesting support, etc. When a player makes such cooperation requests, the response behavior of other players will be recorded. The game will set up a series of behaviors regarded as positive responses, wherein switching the game perspective to view and going to the player position should be all considered positive responses. After the game ends, it is to determine the positive degree of the player in this game according to whether the player actively responds to the cooperation request.

Figure 3:
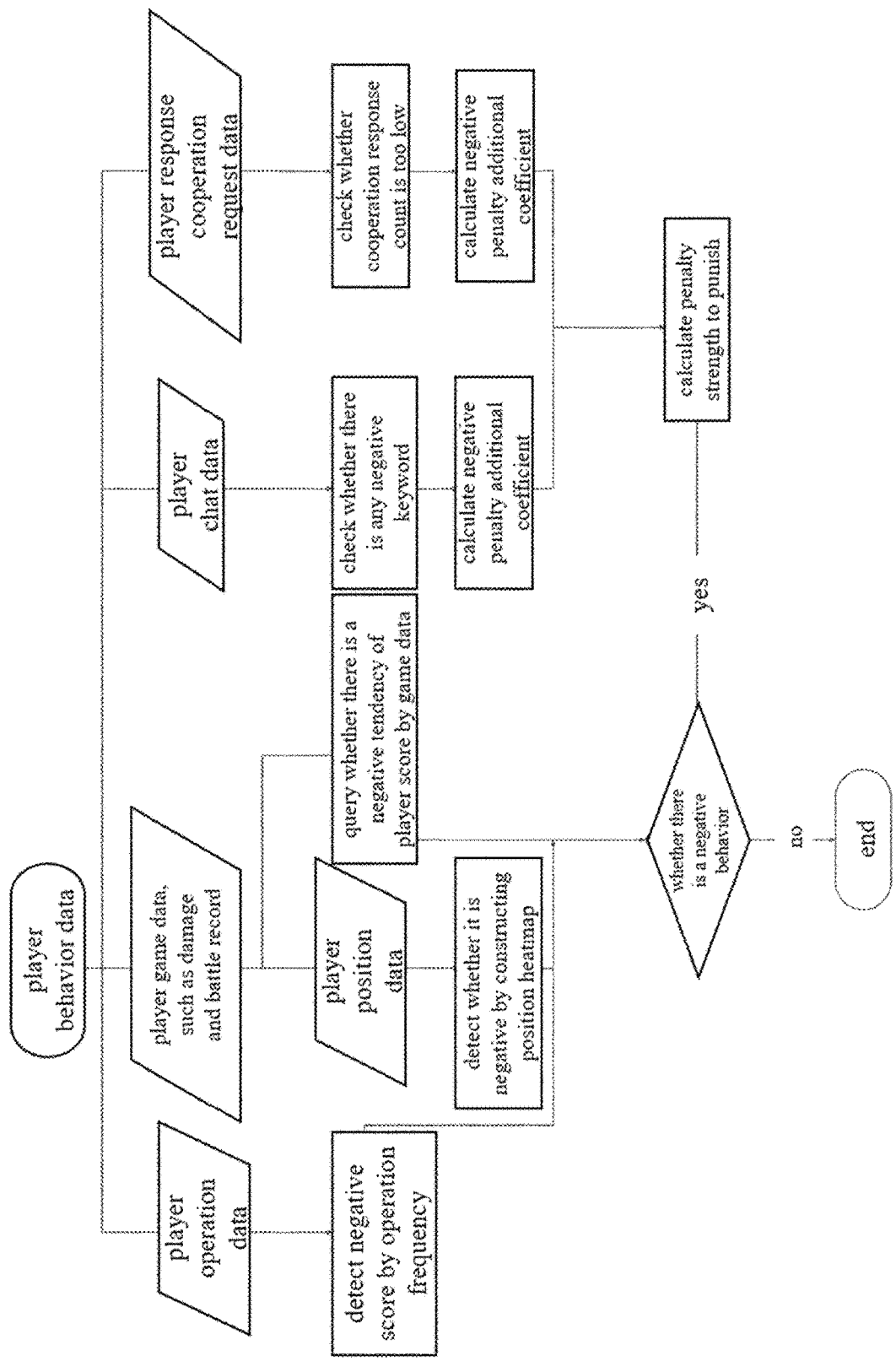
FIG. 3 is another flow diagram of a player negative behavior detection based on the embodiments of the present disclosure.

In addition, FIG. 3 is another flow diagram of the player negative behavior detection based on the embodiments of the present disclosure.

Through the above steps S101 to S103, it is to comprehensively collect the behavioral data such as the player operation counts, the chat content, the behavioral data, the position information, and the cooperation request responses in the single-round game; it is to process and analyze the data by calculating the operation frequency score and the single behavior score, construct a position heatmap, count the negative word counts, and calculate the cooperation request response counts, so as to obtain multi-dimensional detection data such as game behavior, game performance, and social behavior; and it is to compare the comprehensive operation frequency score of the player, the single behavior score, and the expected score, and combine the comparison to the scores of the other players in the team, so as to determine the negative behavior, and to output the reminding information. This solution effectively solves the problems of the prior reporting system relying on the active report by players and lower detection efficiency, thereby more comprehensively and accurately detecting the negative behavior, maintaining the fairness and healthy environment of the game, and improving the game experience of the players.

It should be noted that the steps shown in the above process or the flow diagrams in the drawings can be executed in a computer system such as a group of computer-executable instructions. Moreover, although the logical order is shown in the flow diagrams, in some cases, the steps shown or described can be executed in a different order from here.

Figure 4:
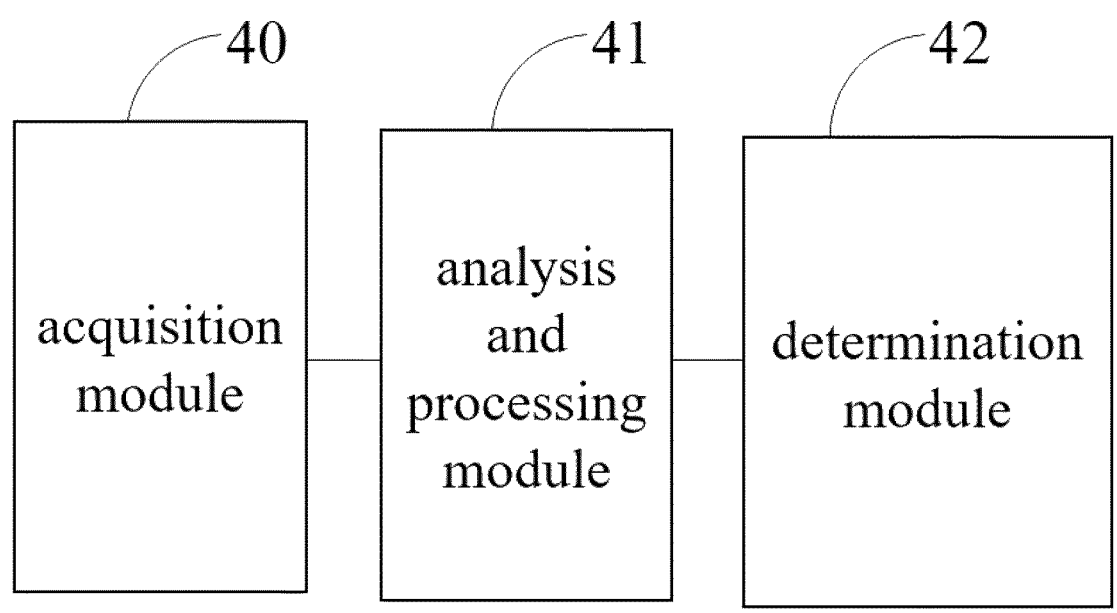
FIG. 4 is a structure block diagram of a player negative behavior detection system based on the embodiments of the present disclosure.

The embodiments of the present disclosure further provide a player negative behavior detection system. FIG. 4 is a structure block diagram of a player negative behavior detection system based on the embodiments of the present disclosure. As shown in FIG. 4, the system includes: an acquisition module 40, an analysis and processing module 41, and a determination module 42, wherein the acquisition module 40 is configured to acquire game data of a player during a single-round game process;

the analysis and processing module 41 is configured to analyze and classify the game data to obtain multi-dimensional detection data, wherein the multi-dimensional detection data includes: game behavior data, game performance data, and social behavior data; and the determination module 42 is configured to determine whether the player has a negative behavior based on the multi-dimensional detection data, and to output negative behavior reminding information if yes.

Through the above system, it is to comprehensively collect the behavioral data such as the player operation counts, the chat content, the behavioral data, the position information, and the cooperation request responses in the single-round game; it is to process and analyze the data by calculating the operation frequency score and the single behavior score, construct a position heatmap, count the negative word counts, and calculate the cooperation request response counts, so as to obtain multi-dimensional detection data such as game behavior, game performance, and social behavior; and it is to compare the comprehensive operation frequency score of the player, the single behavior score, and the expected score, and combine the comparison to the scores of the other players in the team, so as to determine the negative behavior, and to output the reminding information. This solution effectively solves the problems of the prior reporting system relying on the active report by players and lower detection efficiency, thereby more comprehensively and accurately detecting the negative behavior, maintaining the fairness and healthy environment of the game, and improving the game experience of the players.

Figure 5:
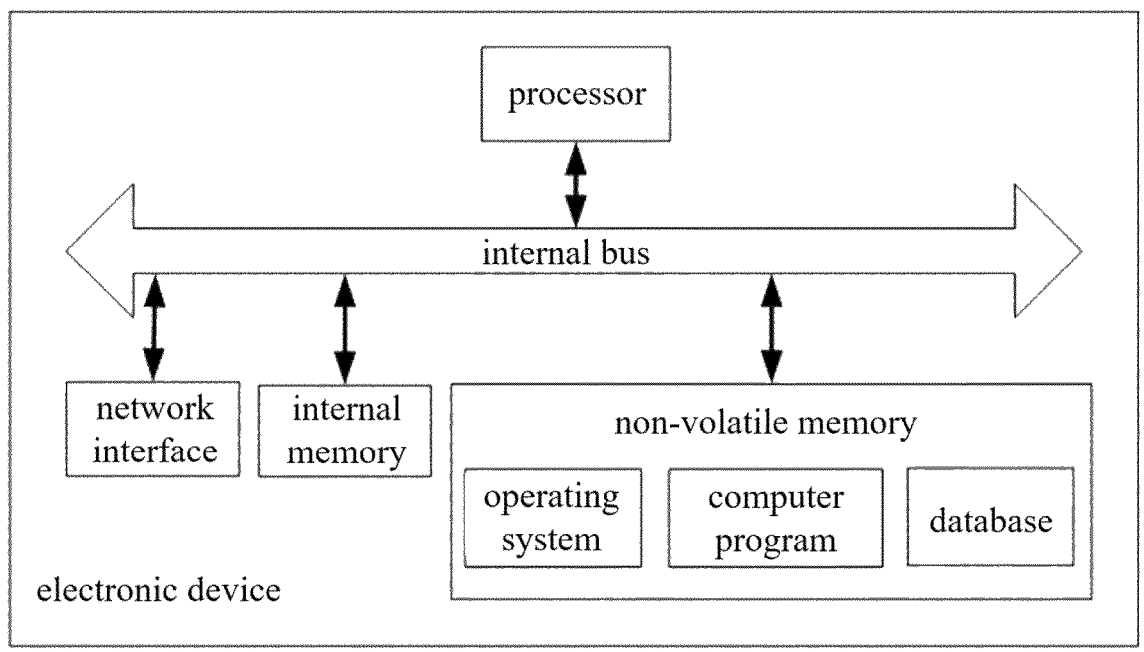
FIG. 5 is an internal structure schematic diagram of an electronic device based on the embodiments of the present disclosure.

In one embodiment, FIG. 5 is an internal structure schematic diagram of an electronic device based on the embodiments of the present disclosure. As shown in FIG. 5, an electronic device is provided, wherein the electronic device can be a server, and the internal structure diagram is shown in FIG. 5. The electronic device includes a processor, a network interface, an internal memory, and a non-volatile memory connected by an internal bus, wherein the non-volatile memory stores an operating system, a computer program, and a database. The processor is used to provide computing and control capabilities; the network interface is used to communicate with external terminals via a network connection; and the internal memory is used to provide an operation environment for an operating system and a computer program, wherein the computer program is executed by the processor to implement a player negative behavior detection method; and the database is used to store data.

It will be understood by those skilled in the art that the structure shown in FIG. 5 is only a block diagram of a part of the structure related to the technical solutions of the present disclosure, does not constitute a limitation on the electronic device to which the embodiment of the present disclosure is applied. The specific electronic device may include more or fewer components than those shown in the figures, combine certain components, or have different component arrangements.

Those skilled in the art can understand that the implementation of all or part of the processes in the above embodiments can be accomplished by instructing the relevant hardware through a computer program, wherein the computer program can be stored in a non-volatile computer-readable storage medium, when the computer program is executed, it may include the processes of the embodiments of the above methods Any references to the memory, storage, databases, or other media used in each embodiment provided by the present disclosure may all include non-volatile and/or volatile memory. The non-volatile memory may include Read-Only Memory (ROM), Programmable ROM (PROM), Electrically Programmable ROM (EPROM), Electrically Erasable Programmable ROM (EEPROM), or flash memory. The volatile memory may include Random Access Memory (RAM) or external cache memory. As an illustration rather than a limitation, RAM is available in various forms, such as static RAM (SRAM), dynamic RAM (DRAM), synchronous DRAM (SDRAM), dual data rate SDRAM (DDRSDRAM), enhanced SDRAM (ESDRAM), synchlink DRAM (SLDRAM), ram bus direct RAM (RDRAM), direct memory bus dynamic RAM (DRDRAM), and memory bus dynamic RAM (RDRAM).

The above embodiments only show several embodiments of the present disclosure, and their descriptions are more specific and detailed, but cannot therefore be understood as limiting the scope of the present disclosure. It should be noted that for a person of ordinary skill in the art, several deformations and improvements can be made without departing from the conception of the present disclosure, all of which fall within the scope of protection of the present disclosure. Therefore, the scope of the protection of the present disclosure shall be subject to the scope of the claims attached.

INDUSTRIAL APPLICABILITY

Through the player negative behavior detection method provided by the embodiments of the present disclosure, it is to comprehensively collect the behavioral data such as the player operation counts, the chat content, the behavioral data, the position information, and the cooperation request responses in the single-round game; it is to process and analyze the data by calculating the operation frequency score and the single behavior score, construct a position heatmap, count the negative word counts, and calculate the cooperation request response counts, so as to obtain multi-dimensional detection data such as game behavior, game performance, and social behavior; and it is to compare the comprehensive operation frequency score of the player, the single behavior score, and the expected score, and combine the comparison to the scores of the other players in the team, so as to determine the negative behavior, and to output the reminding information. This solution effectively solves the problems of the prior reporting system relying on the active report by players and lower detection efficiency, thereby more comprehensively and accurately detecting the negative behavior, maintaining the fairness and healthy environment of the game, and improving the game experience of the players.

The invention claimed is:

1. A player negative behavior detection method, applicable to a PVP online game, wherein the method comprises:
    acquiring game data of a player during a single-round game process;
    analyzing and classifying the game data to obtain multi-dimensional detection data, wherein the multi-dimensional detection data comprises: game behavior data, game performance data, and social behavior data; and
    obtaining multi-dimensional negative detection information respectively based on the multi-dimensional detection data, determining, by a server, whether the player has a negative behavior through combining the multi-dimensional negative detection information and outputting negative behavior reminding information if yes;
    wherein the game behavior data comprises: movement counts, skill usage counts, item usage counts, attack counts, real-time positions of the player in the single-round game process;
    the game performance data comprises: defeat counts, assist counts, death counts, and total damage; and
    the social behavior data comprises: negative speech counts and cooperation request response counts;
    wherein the step of determining, by the server, whether the player has a negative behavior based on the game performance data comprises:
    obtaining a plurality of different types of single-round performance averages according to the defeat counts, the assist counts, the death counts, the total damage, and a single-round game duration respectively, and assigning different weight coefficients to each of the single-round performance averages respectively;
    performing a weighting operation on the plurality of single-round performance averages after assigning the weight coefficients, so as to obtain a game performance score of each player;
    obtaining a benchmark score as a reference standard for measuring a performance of the player according to game performance scores of players in the same camp during the single-round game process, wherein the benchmark score reflects a performance level that the player should achieve when actively participating in the game and reasonably exerting an ability of a character under ideal conditions; and
    determining, by the server, whether the player has the negative behavior according to a difference between a game performance score of any one of the players and the benchmark score, and differences between the game performance score of any one of the players and that of the other players in the same camp, and outputting the negative behavior reminding information if yes,
    wherein the method further comprises:
    generating a player position heatmap according to a real-time position of the player in the single-round game process; and
    determining, by the server, whether the player has the negative behavior according to a proportion of the player position heatmap to a global game map, if yes, calculating a penalty severity and punishing the player accordingly.

2. The method according to claim 1, wherein the step of determining whether the player has a negative behavior based on the game behavior data comprises:
    obtaining a plurality of operation frequencies of different dimensions according to the movement counts, the skill usage counts, the item usage counts, the attack counts, and a single-round game duration respectively, and assigning different weight coefficients to each of the operation frequencies respectively;
    performing weighting operations on the plurality of operation frequencies after assigning the weight coefficients to obtain a comprehensive operation frequency score;
    obtaining a single behavior score according to a minimum value and a maximum value of the movement counts, the skill usage counts, the item usage counts, and the attack counts; and
    determining whether the player has the negative behavior by determining whether the comprehensive operation frequency score and the single behavior score meet an expected score, and outputting the negative behavior reminding information if yes.

3. The method according to claim 2, wherein the step of determining whether the player has a negative behavior based on the social behavior data comprises:
    determining whether the player has the negative behavior according to the negative speech counts, and outputting the negative behavior reminding information if yes; adjusting the weight coefficients assigned to each of the operation frequencies or each of the single-round performance averages according to the negative speech counts, and performing a weighting operation according to the operation frequencies or the single-round performance averages after adjusting the weight coefficients; and
    determining whether the player has the negative behavior according to the cooperation request response counts, and outputting the negative behavior reminding information if yes.

4. The method according to claim 3, wherein the step of analyzing and processing the game data to obtain multi-dimensional detection data comprises:
    constructing a preset negative word database according to an open-source database and historical battle data to acquire a chat log sent by the player to a battle environment via a social system during the single-round game process;
    matching the chat log with the preset negative word database to obtain the negative speech counts;
    acquiring an operation behavior of the player during a target time period after a cooperation request from another player in the same camp; determining whether the operation behavior is an operation behavior in response to the cooperation request by matching the operation behavior with a preset response action database; and acquiring operation behavior counts to obtain the cooperation request response counts if yes.

5. A computer device, comprising a memory, a processor, and a computer program stored in the memory and operable in the processor, wherein the processor executes the computer program to implement the method according to claim 1.

6. A non-transitory computer-readable storage medium, with a computer program stored thereon, wherein the method according to claim 1 is implemented when the computer program is executed by a processor.

\* \* \* \* \*